Figure 1:
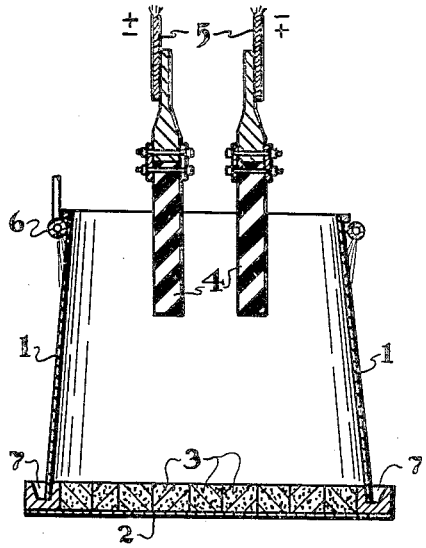

April 8, 1941.                R. R. RIDGWAY                2,237,503
            TITANIUM CARBIDE AND A METHOD OF MAKING THE SAME
                         Filed April 19, 1937

Witness
Robert G. Trumbull

Inventor
Raymond R. Ridgway
By Clayton L. Jenks
          Attorney

Patented Apr. 8, 1941

2,237,503

UNITED STATES PATENT OFFICE 2,237,503

TITANIUM CARBIDE AND A METHOD OF MAKING THE SAME

Raymond R. Ridgway, Niagara Falls, N. Y., assignor to Norton Company, Worcester, Mass., a corporation of Massachusetts Application April 19, 1937, Serial No. 137,620

3 Claims. (Cl. 23—208)

This invention relates to titanium carbide and methods of making the same.

Titanium occurs in nature in various types of ores such as rutile, ilmenite and titanite. These ores, even in their purest state, contain iron, silicon and aluminum as regular impurities. Alkaline earth metals, such as calcium, are likewise commonly found in various titania rich ores. The standard processes heretofore practiced for reducing a titanium oxide ore and making titanium carbide have left metallic impurities which alloyed readily with the titanium carbide and so formed a metallic-like, noncrystalline material having more the properties of a ferro alloy than of the desired titanium carbide. The alkaline earth metals tend to produce an undesired instability in the material and these are readily formed at the high temperatures of the electric furnace reaction heretofore employed. Consequently, that material of commerce which has been called titanium carbide has actually been either at titanium rich alloy containing a considerable excess of metallic titanium over the theoretical requirements of the compound TiC, which is the true carbide of titanium, or the compound has been largely contaminated with titanium nitride and cyanonitrides which are the results of the great affinity of metallic titanium for nitrogen. The material as thus made has been variously used for impregnating arc light carbons or as addition agents to metal and for absorbing nitrogen in chemical reaction. But it has been unsuitable for many other purposes, since it did not have a high degree of hardness and toughness or a coarse crystallinity or good mechanical properties. Because of the impurities in the material, it has not been known that pure titanium carbide has a hardness very close to that of silicon carbide, as well as a toughness and resistance to impacts and compressional stresses which would make the material suitable for many industrial purposes.

In accordance with this invention, I have discovered that titanium carbide may be made of high purity and a crystalline structure which is extremely hard, tough and strong under various stresses, and the primary object of this invention is therefore to produce titanium carbide of a high degree of purity and of a desired crystalline structure and physical characteristics.

A further object of the invention is to provide a method of making titanium carbide from chemically precipitated titanium oxide and to produce therefrom a titanium carbide of satisfactory properties. Further objects will be apparent in the following disclosure.

In accordance with this invention, I propose to make titanium carbide from a purified titania, and particularly chemically precipitated titanium dioxide which is relatively free from silicon, iron and aluminum as well as the alkaline earth metals and which is in the form of a purified powder of a high content of $TiO_2$. This material cannot be readily reduced directly to the carbide except with difficulty owing primarily to its being a fluffy powder of low density. I therefore propose to shrink it to a dense form by electrical fusion in a Higgins' type open arc furnace and to crystallize it as a material of high density. Then, this pre-shrunk crystalline titanium oxide is intermixed with carbon in stoichiometric proportions for the manufacture of titanium carbide, and the latter is formed by electrical synthesis in a resistor type of electric furnace and preferably one which insures the exclusion of oxygen and nitrogen from the reagents during formation and the cooling of the product.

Figure 2:
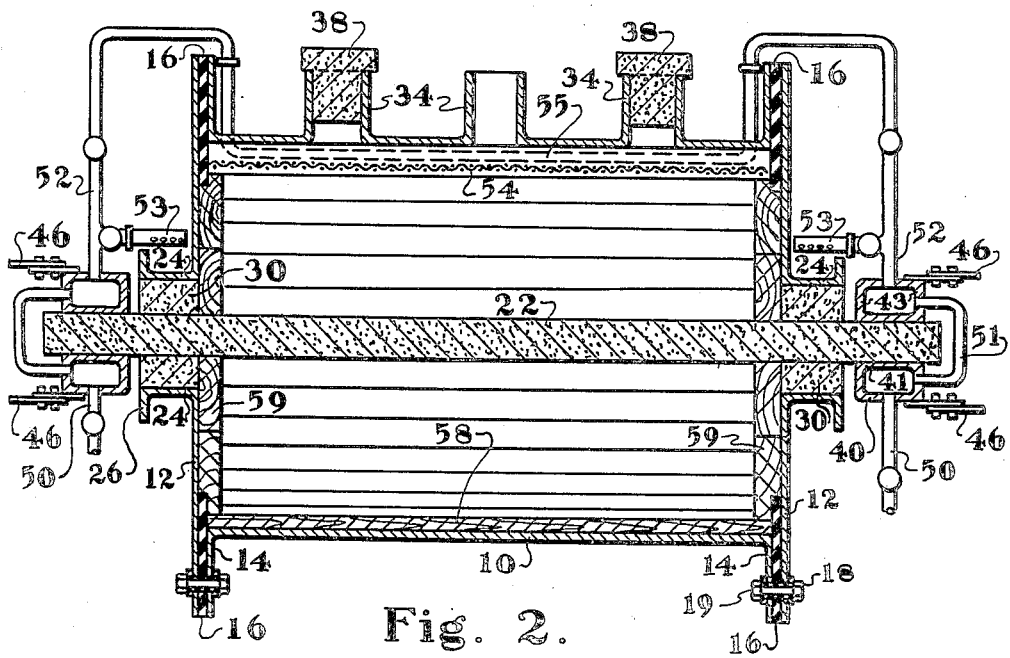

The accompanying drawing shows diagrammatically the two types of furnace required for the production of the crystalline titania and the titanium carbide, wherein:

Fig. 1 is a diagrammatic vertical section of a suitable electric arc furnace for melting the titania so that it may be crystallized in a dense form; and Fig. 2 is a vertical central section of one type of closed furnace suitable for reducing the titania to titanium carbide.

For the purposes of carrying out this process, I select titanium oxide and preferably that material which is substantially free from silicon, iron, alumina and the alkaline earth metals. A commercially available material is titanium dioxide of high purity which has been developed for use in the ceramic arts or as a paint pigment. This titania is in the form of a fluffy powder of a light weight or density obtained by chemical precipitation from a solution derived from the raw minerals rutile, brookite, ilmenite or other natural sources. The purified material contains over 98% titanium dioxide, with silica as the principal impurity. This titania as precipitated from solution has a weight per cubic foot of from 30 to 40 pounds. Owing to its being in this condition of a loose and light weight powder, it is difficult to mix it properly with the carbon and to produce a proper furnacing operation. Hence, in accordance with this process, I propose to convert this low density titania to a product of high density whereby the chemically precipitated titania is first brought to a better physical form before it is subjected to the electrical reduction process.

To this end, the fluffy light weight powder is first melted in an electric arc furnace, which may comprise, as shown diagrammatically in Fig. 1 of the drawing, an iron shell 1 shaped as the frustum of a cone and having an open top. This shell is adapted to be removably mounted on a base of suitable construction and arrangement, such as an iron plate 2 carrying a flooring of carbon bricks 3. The titania powder is charged slowly into this shell while it is electrically heated to a temperature above 1600° C. and melted by means of an arc between the graphite electrodes 4, which are suitably suspended within the shell at an adjustable elevation, as by means of the conductor cables 5 through which an electrical current of required amperage and voltage is passed while the arc is regulated by raising and lowering the electrodes. A water pipe 6 is arranged around the upper portion of the shell, and it is adapted to supply a stream of water to the outer face of the shell during the operation of the furnace which runs down into an annular trough 7 into which the shell fits. The water serves to form an insulation of the cooled titania which will protect the iron shell from the intense heat required to melt the material. That is, as the electrical current is applied to the material and the latter is melted, the water cooled shell tends to freeze the molten material as a crystalline mass onto the inner face of the iron shell and thus form an insulation body of required physical characteristics for protecting the shell from being burned through. Inside this coating of cooled titania, the molten mass gradually builds up as the raw material is fed to the furnace until the entire shell is substantially full.

During the furnace run, the positions of the electrodes are adjusted vertically, in order to give the desired kilowattage, and ultimately the electrodes are withdrawn from the furnace and the material is allowed to cool partially within the shell so that it will retain its form when the shell is removed. After the shell has been withdrawn from the ingot and the latter has been allowed to stand long enough to become solid, the mass may be crushed by suitable means and the fragments broken up in an ordinary rock crusher to a suitable size for the reduction step. Rapid cooling of the ingot will form small crystals, which are suitable for the reduction stage. Also, the oxidizing or reducing conditions of the furnace may be suitably regulated to produce either a material that is made up mainly of the lower oxide $Ti_2O_3$ or one which is chiefly $TiO_2$. The material may be a mixture of these oxides, such as one comprising from 15 to 30% of $Ti_2O_3$ and the remainder $TiO_2$. Even under minimum reducing conditions as where the best possible oxidizing conditions are maintained in an open topped, arc heated, melting furnace as here described, some reduction may take place due to the use of graphite electrodes and some $Ti_2O_3$ and/or TiO will be formed. However, it is immaterial what may be the exact chemical composition of the crystallized oxide, since it suffices to analyze it and determine therefrom the stoichiometric proportions of carbon and titanium oxide required for the reduction stage which results in producing the carbide.

By the method so far described, I have provided a dense crystalline titanium oxide of high purity which may comprise $Ti_2O_3$ or $TiO_2$, or $TiO_2$ containing some $Ti_2O_3$ or TiO in solution or combination. This material has a density greater than 4.0 and it may weigh about 250 pounds per cubic foot. The next step of the process involves the reduction of the crystalline titanium oxide by means of carbon and its conversion to titanium carbide. This is preferably accomplished in an electric resistance furnace of the type which permits exclusion of air, and particularly nitrogen and oxygen, during both the heating and the cooling stages or while it is possible for the material to form a nitride and other undesired ingredients. The substantially pure, pre-fused titanium oxide of high density, as made in accordance with the above described method, is crushed to a desired size, such as one which will pass through a screen of 4 or more meshes to the linear inch, and then mixed with a carbon reducing agent and preferably a pure carbon, such as petroleum or pitch coke of high quality which has a low ash content. It is desirable that the carbon be of high purity since its metallic constituents may dissolve in the titanium carbide and produce undesired characteristics. The carbon reducing agent should be made up of particles of such a size that a good uniform mixture without segregation may be made with the crushed crystalline titanium oxide. As an aid to the maintenance of a thorough mixture and to prevent a dangerous explosion due to any included oxygen in the charge, the mixture is preferably wet with kerosene or some other high boiling hydrocarbon. This mixture is then packed around the central rod resistor of a closed gas tight furnace such as is described in my Patent No. 2,123,158 of July 5, 1938, or as is illustrated in Fig. 2 of the drawing.

This furnace may comprise a substantially cylindrical wall 10 and two circular end walls 12 of iron or other suitable material. The peripheral wall is provided with annular flanges 14 at its two ends which are adapted to be spaced from the end walls 12 by means of gas tight insulation 16, such as asbestos. The flange 14 is secured to the end wall 12 by means of suitable bolts 18 and nuts 19, which are also insulated from the metal parts by means of suitable insulation.

The resistor 22 is preferably a graphite rod of suitable electrical resistance characteristics. This rod is mounted axially of the peripheral walls 10 and arranged to extend substantially centrally through the charge and project outwardly from each end of the casing. Each of the end walls 12 is provided with a cylindrical hub 24 which has an outwardly extending flange 26 adapted to form a trough within which cooling water may flow. Graphite sleeves 30 are mounted within the hub 24 and shaped to fit snugly therein and so prevent the escape of gases as well as to conduct heat to the water cooled trough wall 24. These graphite sleeves 30 support the resistor rod which is shaped for an accurate sliding fit therein. Hence, these sleeves 30 form enlarged ends on the resistor which are water cooled sufficiently to prevent chemical reactions near the ends of the rod.

Egress of the generated gases is permitted through the pipe 34 at the top of the casing, and plugs 38 of graphite or other suitable material are arranged to removably close the passes at desired stages of the process and particularly during the cooling stage. While the temperature is rising, some or all of the plugs may be left loosely in place to prevent the circulation of air into the casing and yet permit the generated carbon monoxide to escape.

The electrical connections are made at the two ends of the resistor 22 by means of clamps which may comprise two hollow casings through which water may be circulated for cooling purposes. Each of these casings is preferably made of semi-cylindrical concentric walls 40 and 41 connected by the diametrically positioned wall 42 and end walls 43 to form a closed chamber. The inner wall 41 of each of these clamps is shaped to fit tightly against the resistor rod 22, and the parts are secured together by means of suitable bolts and nuts. An electric terminal 46 may be suitably welded onto the outer water cooled casing at each end of the resistor for conducting current thereto. Various other types of electrical apparatus may be employed in connection with this furnace.

The water for cooling the furnace is conducted through a valved pipe 50 to one-half of the terminal clamp and then through a pipe 51 to the other half. A further pipe 52 carries the water through a perforated pipe 53 arranged adjacent to the trough 24 and to pipes 55 which are likewise perforated and arranged on opposite sides of the outlet 34 for the purpose of spraying water onto the outer iron shell of the casing and thus keeping it sufficiently cool for the furnace operation. A perforated wall 54 made of a coarse meshed screen of iron may be suitably mounted within the furnace beneath the outlet pipes 34 so as to provide a space for the accumulation of gases therein. The charge itself serves as an insulating protection for the inner cooled wall of iron and the reagents cannot attack this wall. As a further insulation, the furnace chamber may be lined with wooden boards 58 and 59 which will carbonize during the run of the furnace but will not be consumed.

This furnace structure makes it possible to carry on the entire reduction process in a controlled atmosphere and particularly with the exclusion of nitrogen and oxygen, and thus preventing the formation of titanium nitride, which tends to form at a temperature as low as 800° C., as well as other nitrogen compounds. Since undesired metals have likewise been excluded from the raw material, then alloys thereof are not formed with the titanium carbide. Special precautions are taken to maintain a reducing and carbonaceous atmosphere in the furnace after the power has been shut off, since the residual heat maintains the charge at a high temperature for some time during which the undesired nitrogen compounds might form. Hence, during this period the plugs 38 are laced in position to cover up all of the openings in the pipe 34 and thus seal the interior of the chamber.

According to the method outlined above, extremely low furnace resistances may be encountered, inasmuch as the titanium carbide as well as the intermediate reduction products are excellent conductors of electricity when heated to a high temperature. Consequently in order to reach the reaction temperature suitable for the reduction of the carbide, a high amperage and a low voltage are required. The temperature of 2600° C. may be reached at the central core of the furnace when the kilowatts per square foot of resistor surface area are maintained between 25 and 50 kw. Various procedures of furnace operation may be adopted and desired changes in furnace design may be made within the skill of those acquainted with this industry.

The operation of this furnace will be apparent in view of the above disclosure. The charge is preferably made in the stoichiometric proportions determined by analysis of the titania as to its oxide content, and the carbon is proportioned for removing this oxygen as carbon monoxide and for combining with the titanium to form titanium carbide. The reaction equations which determine these proportions are considered to be:

$$TiO_2 + 3C = TiC + 2CO$$
$$Ti_2O_3 + 5C = 2TiC + 3CO$$
$$TiO + 2C = TiC + CO$$

The current flow is regulated to insure a desired temperature for the synthesis. During the passing of the current through the resistor the central zone is first heated to a reacting temperature and thereafter a gradually enlarging ingot of titanium carbide is formed. An atmosphere of carbon monoxide is maintained within the charge. The central portion of the ingot is crystalline titanium carbide and surrounding this is a layer of partially reacted materials containing some unconverted graphite and titania and outside of this is the charge of titanium oxide and carbon which has remained unconverted. The reactions which take place within the furnace are not understood but it is believed that the titanium oxide is first reduced to a metallic titanium which volatilizes and passes outwardly in the central heated zone and there combines with carbon to form the desired final product.

Because of the pre-fused and pre-shrunk crystalline nature of the titanium oxide in the charge, the density of the mixture in the furnace and consequently the titanium content found in a given volume is held at the maximum. On the other hand, it is a feature of this method that intercommunicating pore spaces are provided throughout the charge for a uniform escape of the gases of reaction, so that channeling of the charge, due to the necessity for the gas to escape or uneven reactions in the mixture, are avoided. The ingot of titanium carbide develops uniformly in the central temperature zone and the necessary gradation of temperature is provided whereby coarse crystalline material is formed as a progressively enlarging ingot in the zone of highest temperature.

When titanium carbide is manufactured according to the method above described it is of a high metallic luster and well developed crystallinity. Its density is greater than 4.75. The crystals form a hexagonal columnar structure somewhat similar to that developed by silicon carbide made in a standard resistance furnace. When the ingot has been crushed, the crystals are found to be coarse in structure, larger than 100 grit size and to have characteristic well defined faces and sharp crystal edges which makes them suitable for abrasive purposes. The crystals are not coated materially with colored nitrides or cyanonitride, as has been the case with commercial products heretofore developed. The combined nitrogen in this product may be readily maintained below 0.2 of 1% so that the carbide is substantially free from titanium nitrogen compounds, whereas ordinary commercial products heretofore called titanium carbide have had upwards of 5 to 10% of dissolved nitrogen. Also, it is substantially free from iron, silicon and alkaline earth metals, since the raw titania used for the furnace charge had a purity of at least 98% titania. This product is further unique in that it has a high strength of grain coupled with a hardness in excess of that of crystalline alumina, or above 9 on Mohs' scale. Hence, these properties make it useful for both abrasive and refractory purposes.

It will also be understood, in view of the above disclosure, that the preshrunk or crystalline titania of any composition may be obtained from other sources provided it has that purity of composition which is required for the final product. This material should be analyzed for its oxygen content and the carbon calculated stoichiometrically to convert all of the oxygen to carbon monoxide and to combine with the titanium as titanium carbide. The process should be so carried on that oxygen and nitrogen are excluded from the reaction zone during both the heating and the cooling stages, until the temperature has reached a point where the carbide is stable. This is accomplished by employing a closed furnace of the type herein described, which has a resistor located centrally within the charge and surrounded by walls that prevent the admission of air. In such a furnace, the titanium carbide is made as a progressively enlarging ingot which grows outwardly from the hottest central zone surrounding the resistor. By starting with the preshrunk granular crystalline titanium oxide which has been purified and by following the steps herein described, a titanium carbide free from nitrogen compounds and of otherwise required purity is obtained.

I claim:

1. A composition of matter comprising a massive ingot of titanium carbide having a hexagonal columnar crystalline structure with the majority of the individual crystals larger than 100 grit size and characterized by a high metallic luster and well defined crystal faces and sharp edges, a hardness above 9 on Mohs' scale, and a density greater than 4.75, which is substantially free from titanium nitrogen compounds, as well as iron, silicon, graphite and alkaline earth metals.

2. The method of making titanium carbide comprising the steps of completely fusing titanium oxide and thereafter cooling and crystallizing the same, mixing the crystalline product in a granular condition with carbon proportioned stoichiometrically for making titanium carbide and heating the mixture about a furnace resistor while excluding oxygen and nitrogen and progressively forming an ingot of titanium carbide therefrom.

3. The method of making titanium carbide comprising the steps of completely fusing chemically precipitated purified titanium oxide in an electric furnace and under reducing conditions, cooling and crystallizing the mass and thereby forming a crystalline product containing titanium dioxide and a lower oxide, mixing the crystalline material in granular form with carbon proportioned stoichiometrically for making titanium carbide and thereafter heating the mixture about a furnace resistor while excluding oxygen and nitrogen and progressively forming an ingot of titanium carbide therefrom.

RAYMOND R. RIDGWAY.